(12) United States Patent
Hinkle et al.

(10) Patent No.: US 12,494,229 B1
(45) Date of Patent: Dec. 9, 2025

(54) ONLINE VIDEO EDITING WITH ADAPTIVE HTTP STREAMING

(71) Applicant: mmhmm inc., Bentonville, AR (US)

(72) Inventors: Christopher Winson Hinkle, Oakland, CA (US); Michael M. Liu, Portola Valley, CA (US)

(73) Assignee: mmhmm inc., Bentonville, AR (US)

( * ) Notice: Subject to any disclaimer, the term of this patent is extended or adjusted under 35 U.S.C. 154(b) by 0 days.

(21) Appl. No.: 18/899,936

(22) Filed: Sep. 27, 2024

Related U.S. Application Data

(60) Provisional application No. 63/586,427, filed on Sep. 29, 2023.

(51) Int. Cl.
*G11B 27/036* (2006.01)
*H04N 21/234* (2011.01)
*H04N 21/845* (2011.01)

(52) U.S. Cl.
CPC ..... *G11B 27/036* (2013.01); *H04N 21/23418* (2013.01); *H04N 21/8456* (2013.01)

(58) Field of Classification Search
CPC ..... G11B 27/031; G06F 40/35; G06V 40/174; G06V 10/82; G06V 20/41; G06V 10/776; G06V 27/34
See application file for complete search history.

(56) References Cited

U.S. PATENT DOCUMENTS

2015/0189130 A1\* 7/2015 Milosevski ............ H04N 23/64
386/224

FOREIGN PATENT DOCUMENTS

GB 2370932 A \* 7/2002

\* cited by examiner

*Primary Examiner* — Mishawn N. Hunter
(74) *Attorney, Agent, or Firm* — Westborough IP Group, LLC

(57) ABSTRACT

Editing a video stream includes detecting defects in an original version of the video stream, marking up the original version of the video stream to indicate one or more segments having at least one of the defects that are detected, and building a compact editable copy of the original version of the video stream that includes editing positions corresponding to the one or more segments and includes abbreviated summaries of other segments of the original video stream that are between the editing positions. Editing a video stream also includes modifying the compact editable copy by editing the one or more segments having at least one of the defects to provide a modified compact editable copy and constructing an edited video by replacing the abbreviated summaries in the modified compact editable copy with corresponding ones of the other segments of the original video stream that are between the editing positions.

18 Claims, 7 Drawing Sheets

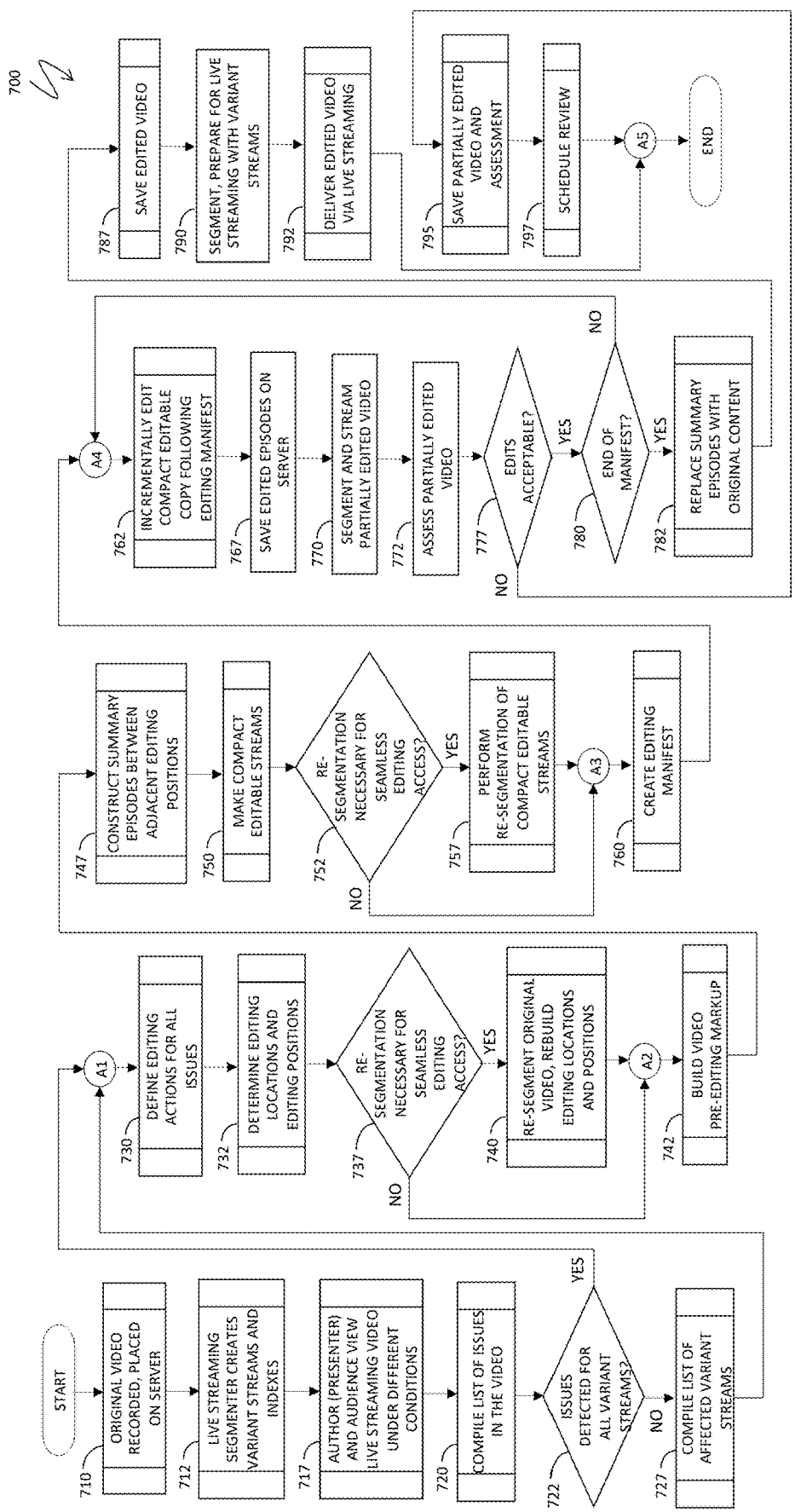
FIG. 7. System flow diagram

ONLINE VIDEO EDITING WITH ADAPTIVE HTTP STREAMING

CROSS-REFERENCE TO RELATED APPLICATIONS

This application claims priority to U.S. Prov. App. No. 63/586,427, filed on Sep. 29, 2023, and entitled "ONLINE VIDEO EDITING WITH ADAPTIVE HTTP STREAMING", which is incorporated herein by reference.

TECHNICAL FIELD

This application is directed to the fields of video streaming, video editing, visual communications, and user interfaces, and more particularly to the field of online video editing with adaptive HTTP streaming.

BACKGROUND OF THE INVENTION

Online video content has become the fastest growing and the most important productivity, education, e-commerce, and entertainment medium. According to a 2024 Zight Report, videos accounted for 82.3% of all web traffic in 2023. In 2024, the number of digital video viewers worldwide exceeded 3.3 billion, of which over 160 million users resided in the United States. On the global scale, online videos have a 92% reach of the worldwide internet audience.

Among all website features, videos have the highest reach on almost every social media platform. Fifty-four percent of businesses are using videos on their landing pages—the addition of video content on website pages increases user engagement by 88% and boosts the average time spent on a web page from 54 seconds to almost 6 minutes.

In 2023, people watched on average over 2 hours of video content every day. The list of ten most popular types of video content includes tutorials and How To videos, educational and product review videos, Vlogs, and Influencer videos. To understand more about a product or service, 96% of consumers see an explainer video.

Online video content is delivered in many forms: pre-recorded and available on demand, captured during live events, or updated continuously. According to recent market research data, 83% of consumers in the United States were using a subscription video-on-demand service in 2023, an increase of over 10 percentage points in five years.

A key growth factor and requirement for the online video market is the efficient content delivery. Online users have low tolerance for content latency or its low quality; thus, 47% of internet users expect the website load time to be within two seconds; bounce rates jump to almost a quarter of site visitors at the four-second latency.

Media rich video content is especially sensitive to bandwidth, device, and location limitations. The requirement of seamless content delivery has been addressed by the development of live streaming technologies and content delivery infrastructure, which currently includes live HTTP streaming technologies, such as Fragmented MP4 (fMP4), Apple HLS and corresponding low latency enhancements, and natively available in HTML5 browsers. Live HTTP streaming already accounts for more than 25% of internet video traffic: in Q1-Q4, 2023, the share of worldwide internet users watching live streaming content on a weekly basis has increased from 27.4% in Q1 to 28.5% in Q4. In the US, 42% of people have watched live-streamed content, and 44% of viewers say they watch less TV as a result of live streaming; additionally, live streaming content generates 27% more minutes of watch time per viewing than on-demand video In addition to three key providers of video content: YouTube, Netflix, and Amazon Prime Video, there is a growing number of online video hosting and editing repositories and services for businesses, facilitating and providing live streaming services, including Wistia, Brightcove, and Vidyard. Distribution architecture for live HTTP/HTML5 video streaming includes Content Delivery Networks (CDNs), such as Akamai, Fastly, Cloudflare, etc., as well as online video platforms with integrated CDNs (Vimeo, IBM Cloud Video, Dacast, and other integrated services).

SUMMARY OF THE INVENTION

Notwithstanding the progress in video streaming, one area of the video industry, namely, video editing, requires serious improvements. By the end of 2023, video is expected to account for 82% of all content generation, a 15-fold increase from 2017. Bandwidth adaptive, low latency streaming significantly enhances editing access to long-form videos for the mainstream audience. However, online video editing may interfere with the streaming environment, especially with the original segmenting of a newly recorded video and the variant streams. Additionally, some of the shortcomings of a newly recorded video may depend on the streaming properties of the content and may be experienced only by a portion of content viewers under specific networking, hardware, and software conditions.

Accordingly, it is important to design techniques and systems for efficient editing of online video content compatible with the live streaming environment.

According to the system described herein, editing a video stream includes detecting defects in an original version of the video stream, marking up the original version of the video stream to indicate one or more segments of the original video stream having at least one of the defects that are detected, building a compact editable copy of the original version of the video stream that includes editing positions corresponding to the one or more segments having at least one of the defects and includes abbreviated summaries of other segments of the original video stream that are between the editing positions, modifying the compact editable copy by editing the one or more segments having at least one of the defects to provide a modified compact editable copy, and constructing an edited video by replacing the abbreviated summaries in the modified compact editable copy with corresponding ones of the other segments of the original video stream that are between the editing positions. The other segments of the original video stream that are between the editing positions may be stored in a database that is separate from the compact editable copy and the modified compact editable copy. Constructing the edited video may include accessing the database to replace the abbreviated summaries with the corresponding ones of the other segments. Locations of boundaries of the segments of the original video stream may be adjusted for the modified compact editable copy in response to the at least one of the defects spanning multiple ones of the segments of the original video stream. Detecting defects in an original version of the video stream may include replaying the original version of the video stream to different audiences and under different networking, hardware and system conditions and settings. The defects may correspond to deficiencies of a story provided by video stream, deficiencies of text provided in video stream, deficiencies of visual materials, deficiencies of audio materials, presentation quality of materials, behavior and presentation skills of the presenter(s), and/or communication aspects of the presentation. Modifying the compact editable copy may include one or more editing actions. The editing actions may include data corresponding to descriptions of issues, editing instructions, supplementary materials, and assigned editors. The editing actions may include augmentation, replacement, deletion, and editing in place. The original version of the video stream may be provided as a plurality of variant streams and each of the variant streams may correspond to a specific combination of networking, hardware, system conditions, and settings. A subset of the defects may be independent from the networking, the hardware, the system conditions, and the settings. The subset of the defects that is independent from the networking, the hardware, the system conditions, and the settings may cause a plurality of editing positions to be replicated in each of the variant streams. Editing a video stream may include creating a manifest having a navigable list of the variant streams and providing entries corresponding to editing actions for the variant streams. At least some entries of the manifest may correspond to the subset of the defects that is independent from the networking, the hardware, the system conditions, and the settings. Editing a video stream may include modifying the entries of the manifest in response to applying editing actions to the segments of the modified compact editable copy. The manifest may be used by different editors to transition at least some of the entries through different editing states. The different editing states may include "draft", "complete", and "revised". The manifest may be used to construct the edited video after the entries of the manifest indicate that all of the editing actions in the manifest have been applied and the editing states of all of the editing actions are "complete" for all editors.

According further to the system described herein, a non-transitory computer readable medium contains software that edits a video stream containing defects that are detected in an original version of the video stream. The software includes executable code that marks up the original version of the video stream to indicate one or more segments of the original video stream having at least one of the defects that are detected, executable code that builds a compact editable copy of the original version of the video stream that includes editing positions corresponding to the one or more segments having at least one of the defects and includes abbreviated summaries of other segments of the original video stream that are between the editing positions, executable code that modifies the compact editable copy by editing the one or more segments having at least one of the defects to provide a modified compact editable copy, and executable code that constructs an edited video by replacing the abbreviated summaries in the modified compact editable copy with corresponding ones of the other segments of the original video stream that are between the editing positions. The other segments of the original video stream that are between the editing positions may be stored in a database that is separate from the compact editable copy and the modified compact editable copy. Constructing the edited video may include accessing the database to replace the abbreviated summaries with the corresponding ones of the other segments. Locations of boundaries of the segments of the original video stream may be adjusted for the modified compact editable copy in response to the at least one of the defects spanning multiple ones of the segments of the original video stream. Detecting defects in an original version of the video stream may include replaying the original version of the video stream to different audiences and under different networking, hardware and system conditions and settings. The defects may correspond to deficiencies of a story provided by video stream, deficiencies of text provided in video stream, deficiencies of visual materials, deficiencies of audio materials, presentation quality of materials, behavior and presentation skills of the presenter(s), and/or communication aspects of the presentation. Modifying the compact editable copy may include one or more editing actions. The editing actions may include data corresponding to descriptions of issues, editing instructions, supplementary materials, and assigned editors. The editing actions may include augmentation, replacement, deletion, and editing in place. The original version of the video stream may be provided as a plurality of variant streams and each of the variant streams may correspond to a specific combination of networking, hardware, system conditions, and settings. A subset of the defects may be independent from the networking, the hardware, the system conditions, and the settings. The subset of the defects that is independent from the networking, the hardware, the system conditions, and the settings may cause a plurality of editing positions to be replicated in each of the variant streams. The software may include executable code that creates a manifest having a navigable list of the variant streams and providing entries corresponding to editing actions for the variant streams. At least some entries of the manifest may correspond to the subset of the defects that is independent from the networking, the hardware, the system conditions, and the settings. The software may include executable code that modifies the entries of the manifest in response to applying editing actions to the segments of the modified compact editable copy. The manifest may be used by different editors to transition at least some of the entries through different editing states. The different editing states may include "draft", "complete", and "revised". The manifest may be used to construct the edited video after the entries of the manifest indicate that all of the editing actions in the manifest have been applied and the editing states of all of the editing actions are "complete" for all editors.

The proposed system identifies necessary editing actions for an online streaming video, creates a markup version of the original video compatible with live streaming structure and variant streams of the video, supplemented with editing information, instructions and additional materials, builds a compact editable copy of the video, creates an editing manifest, allows editing portions of the video and creating an intermediate partially edited copy, and assembles the edited copy of the video with live streaming capabilities.

Various aspects of system functioning are explained as follows.
1. Editing process for a newly recorded online video delivered via HTTP live streaming services (such as HLS, MPEG-DASH, and their low latency modifications) may include five key steps:
   a. Replaying video by different audiences and under different networking, hardware and system conditions and settings and identifying issues (defects, shortcomings) of the original video copy.
   b. Marking up issues identified in the original video and appearing in the playlists of one or multiple variable streams and supplementing each defective portion with editing information: attributes, instructions, and additional materials for future editing.
   c. Building a compact editable copy where defective portions of the video are included with accompanying materials, while some or all non-defective portions may be replaced with compact summaries for accelerated online deployment of the editable copy with HTTP live streaming capabilities.

d. Editing defective portions of the video and creating intermediate partially edited copies.

e. Once the editing process is completed, assembling the edited copy of the video, and building HTTP live streaming capabilities for the modified copy.

Steps a.-e. are further explained below.

2. Identifying issues with the original video may be based on content assessment by the author(s), viewers, editors, possibly a dedicated quality assurance service; identifying issues may also include an automatic assessment based on recognition, AI, and other technologies. For example, displays of undesirable, unacceptable, or unhealthy behaviors and habits by a presenter of video content may be detected as described in U.S. Pat. No. 11,632,258 titled: "RECOGNIZING AND MITIGATING DISPLAYS OF UNACCEPTABLE AND UNHEALTHY BEHAVIOR BY PARTICIPANTS OF ONLINE VIDEO MEETINGS", issued on Apr. 18, 2013, by Libin, which is incorporated by reference herein.

Various types of defects and shortcomings in the original video may be associated with the story, text, visual and audio materials and their presentation quality, various aspects of behavior and presentation skills of the presenter(s), communication aspects of the presentation, etc. Additionally, video and image defects, shortcomings and glitches may be specific to HTTP live streaming specifics, such as viewer side bandwidth, device resolution, and the corresponding adaptive HTTP live streaming playlist.

The compiled list of issues may require categorization by type, severity, and specifics of HTTP live streaming under which certain issues have been observed; some issues may require reproduction and confirmation.

3. Editing actions to fix the identified issues may include:

a. Augmentation-adding more content, such as presenter introduction, extra explanations, conclusion, summary, etc. New content may be separately recorded and inserted as an additional episode of the video at a defined timestamp.

b. Replacing content within a video episode. This may include replacing background imagery, foreground objects, presentation materials, such as slides, audio and/or visual appearance of a presenter, etc., whenever such objects are included within an editable immersive recorded scene (this type of editing is characteristic for advanced video software like mmhmm).

c. Deletion-excluding portions of the video with erroneous, redundant, or undesirable content.

d. Modification in place-editing objects inside video frames, such as replacing erroneous words in a text portion of the frame or resizing an image within a frame.

Note that an editing action of replacing an episode of a video can be performed as a combination of deletion of an original episode and augmenting the modified video by a new episode.

4. Positions and locations of editing actions. Each editing action has a position within the original video. The position of an editing action (the editing position) is a fragment within a playlist (index) of one or multiple HTTP live streams characterizing either (a) an insertion point or interval for an augmentation action, wherein the new content may be added before or after that position; or (b) an interval location, showing a vicinity of an interval wherein the content may be deleted or replaced.

The general formula for an editing position is $P=\{K[C] E[E][C][-K]\}$, where E[E] is an editing location (either a single location E preceding or following an augmentation action or an interval EE of the playlist of the video designated for the editing action of deletion or replacement;

[C][C] is a vicinity of the editing location designated for verification of audio-visual and semantical consistency of the editing action; both the left and the right boundaries of the vicinity are optional;

K is a keyframe of the original video immediately preceding the earlier of the left boundary of the vicinity and the single location E of the augmentation;

-K is a keyframe of a GOP (Group of Pictures) following the later of the right boundary of the vicinity and the single location E of the augmentation; the keyframe -K is not included in the editing position, which therefore is represented by a GOP sequence between the keyframe K (included) and the keyframe -K (not included).

Editing positions may cross the boundaries of playlist segments, so that the first keyframe and the end of GOP of an editing position may belong to different segments and may not coincide with the beginning and end of the segments. In case of short streaming segments, the editing positions may be expanded and rounded to segment edges; otherwise, the boundaries of an editing position P may be either expanded to include the list of affected segments within variant streams or cause a restrictive segmentation update (re-segmentation) of the original video where all editing positions represent continuous sequences of full segments within the relevant variant streams.

5. Editing actions and variant streams. In the event when HTTP live streaming is adapted to multiple bandwidths and other parameters of client devices and is represented by multiple playlists of variant streams, issues identified in the original video and requiring editing may be a. variant stream agnostic, including an addition of an introduction to a video or an explanation of the video or its episodes, fixing errors in slides, deleting occasional undesired behaviors of a presenter; such edits apply to all variant streams;

b. variant stream specific, for example, an illegible slide content streamed at a low bandwidth to a device with insufficient screen resolution.

For global issues that are variant stream agnostic, editing positions must be multiplied for all variant streams; for variant stream specific issues/editing actions, editing positions may remain within the affected streaming playlists.

6. Pre-editing markup. After collecting and categorizing editing actions, defining editing positions and locations, the system compiles a pre-editing markup of the original video distributed via HTTP live streaming as a navigable list representing a bi-directional hypergraph where vertices correspond to editing positions, supplemented with descriptions of issues, editing instructions and materials, assigned editors, and other relevant data, and hypernodes (hyper-vertices) bring together the subsets of editing positions of variant stream agnostic issues (see Section 5a above) across the different variant streams.

7. Compact editable copy of the video is built from the pre-editing markup to facilitate and accelerate online editing. The compact editable copy replaces valid and issue free portions of the original video, such as video episodes situated between the editing positions in every variant stream, with abbreviated audio-visual, textual, or combined summaries. Replacing valid and issue free portions results in the compact editable copy being significantly smaller than the original video, and thus facilitates efficiencies not available for a version of the video without any such replacements, such as the ability to transport the relatively smaller compact editable copy over the internet as described herein. The purpose of the compact editable copy is an accelerated access to a long-form video by the editors. The general formula for building the compact editable copy is as follows:

$\{PXXXPXXPXXXX\ldots\} \to \{P\mathcal{S}P\mathcal{S}P\mathcal{S}\ldots\}$, where the symbol P stands for editing positions, X denotes episodes of an original video, and $\mathcal{S}$ symbolizes summaries of intermediate sequences of episodes between the editing positions.

The compact editable copy of the whole video is a sum of partial copies built for each variant stream; the new content is placed on the server and the HTTP live streaming structure is rebuilt for the compact editable copy, retaining, where possible, the favorable segmentation for editing positions explained at the end of Section 4.

A separate index $\Delta(V)$ of temporarily skipped episode sequences XXX corresponding to the summaries S may be created and stored separately on the server to reconstruct the final edited video.

8. Editing manifest and editing process. The pre-editing markup defines an initial state of the editing manifest $\mathcal{M}$.. As editing progresses, the state of manifest is changing and the vertices may acquire various conditions, such as "draft", "complete", "revised", etc. Each editor may use transitions from issue to issue (arcs of the editing manifest) in the chronological, category related, variant stream related, or other order.

The original video may be edited by one or multiple editors who may navigate the editing manifest M, accessing and modifying portions of the original video for editing positions P included in the manifest. After proofs of successful edits are obtained (optionally using the verification vicinities [C][C] that are included in the editing positions and are tracking potential corrections, as explained in Section 4) editing actions may be marked completed in the manifest; modified episodes may be added to the server repository and referenced by the manifest entries. Following the completion of all editing actions, the manifest M and the index of skipped episode sequences $\Delta(V)$ introduced in Section 7 may be used to reconstruct the edited video $\varepsilon(V)$, which may be published on the server and supplied with a new HTTP live streaming structure for delivery to content viewers.

BRIEF DESCRIPTION OF THE DRAWINGS

Embodiments of the system described herein will now be explained in more detail in accordance with the figures of the drawings, which are briefly described as follows.

FIG. 7 is a system flow diagram illustrating system functioning in connection with online video editing, according to an embodiment of the system described herein.

DETAILED DESCRIPTION OF VARIOUS EMBODIMENTS

The system described herein provides a mechanism for online video editing of streaming videos, facilitated by pre-editing markup, compact editable copies of variant video streams, and navigable editing manifests.

Figure 1:
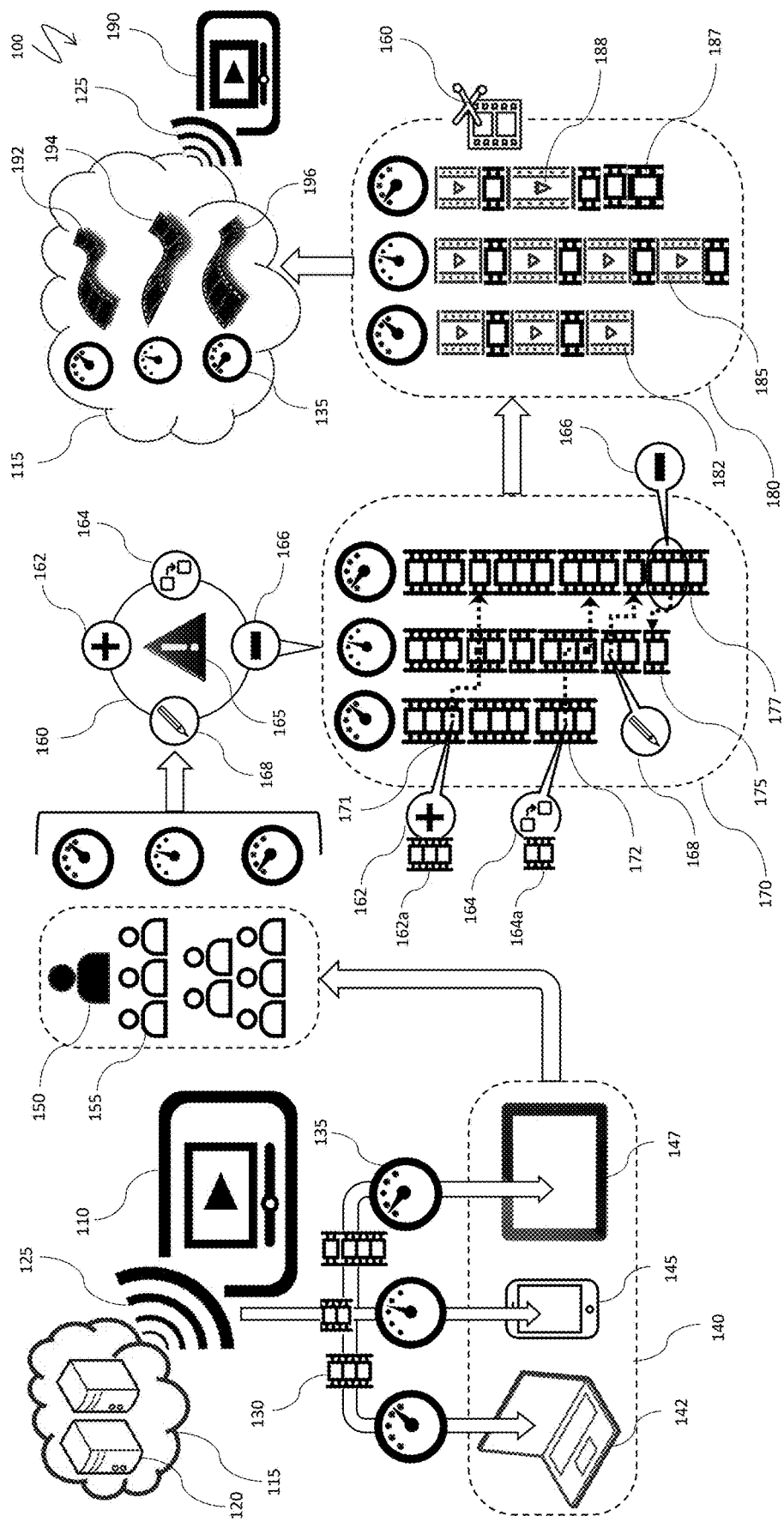
FIG. 1 is a schematic illustration of the system architecture, according to an embodiment of the system described herein.

FIG. 1 is a schematic illustration 100 of architecture of the system described herein. An original video 110 is streamed from a cloud 115 provided by a server farm 120 using a live streaming technology 125. In some instances, the original video could be a pre-recorded live stream that may or may not have been previously altered. Due to the differences in parameters of target user devices 140, such as desktop and notebook computers 142, smartphones 145, and wireless tablets 147, and the varying connectivity bandwidths 135, the streaming technology 125 delivers the video via variant streams 130, adapted to connectivity and device characteristics. The variant streams 130 deliver the video built by an author (or a group of authors) 150 to an audience 155.

Editing requirements 160 in the process of video creation, testing, and distribution may include editing actions such as augmentation 162, replacement 164, deletion 166, and editing in place 168, as explained elsewhere herein (see Section 3 of the Summary); some of the editing actions 162, 164, 166, 168 may address bandwidth specific issues 165, such as a slow or unstable internet connection.

Based on identified issues with the video content and delivery, the system builds a pre-editing markup 170 where each of the editing actions 162, 164, 166, 168 is assigned to a corresponding segment 171 in one of a plurality of variable steams 172, 175, 177 and synchronized across the variable streams 172, 175, 177, as indicated by dotted arrows. Some of the editing actions, such as augmentation 162 and replacement 164, are supplemented with additional video materials 162*a*, 164*a* used during editing.

At a next step, the system builds a compact editable copy 180 of the video to facilitate and accelerate the online editing process. The compact editable copy 180 is a sum of compact editable copies 182, 185, 187, where the video segments free of defects and therefore not participating in the editing process are replaced with textual, visual, and/or audio-visual summaries 188 (see Section 7 of the Summary for details). The editing requirements 160 are performed with the compact editable copy 180. Upon completing the editing, the edited variant video streams are restored to full content copies (summaries of the compact editable copies 180 are replaced with the original content), consolidated in the cloud 115, the system builds new video streams 192, 194, 196 for an edited video 190, and variant streams are delivered to an audience.

Figure 2:
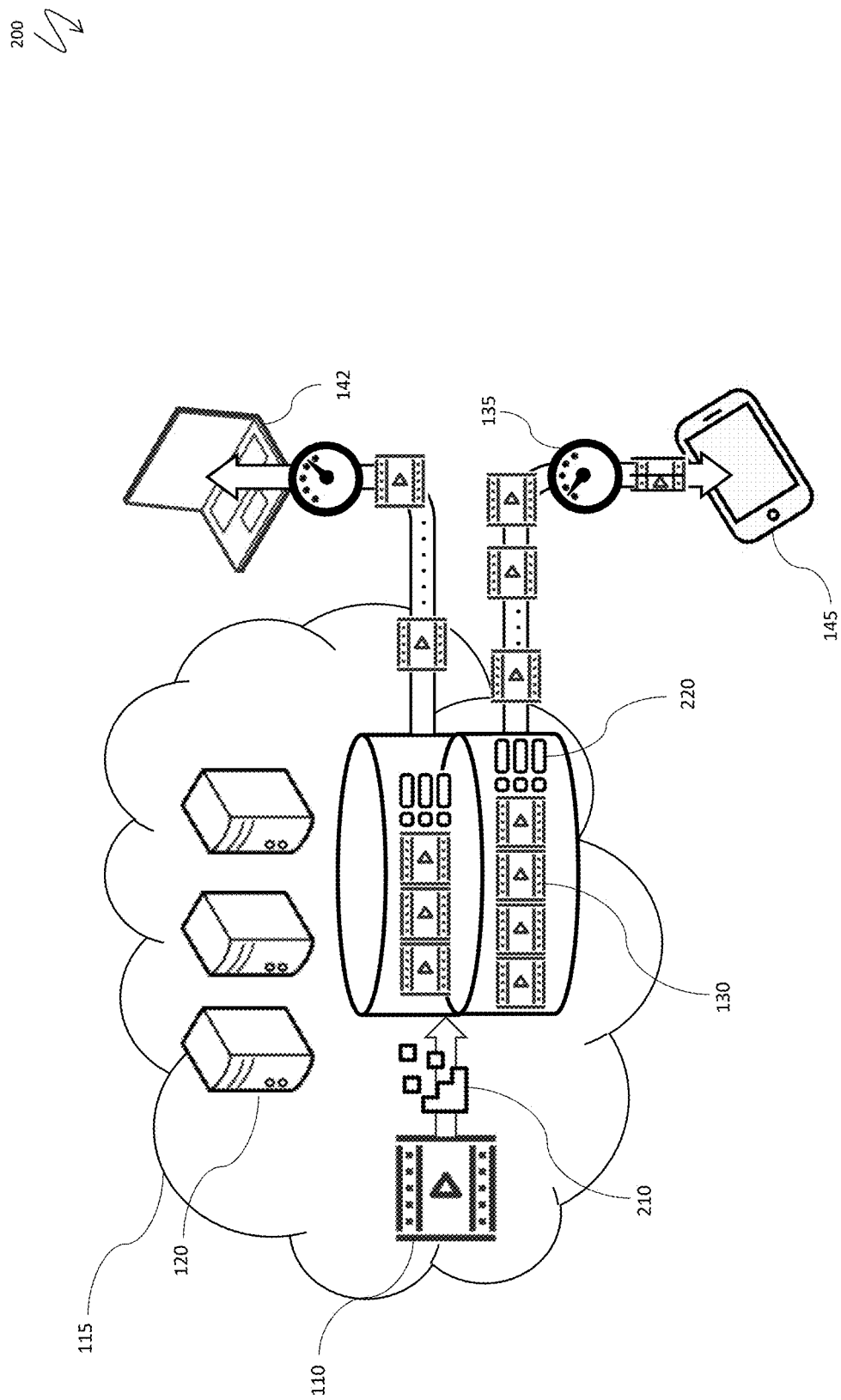
FIG. 2 is a schematic illustration of a segmentation process and variant streams, according to an embodiment of the system described herein.

FIG. 2 is a schematic illustration 200 of the segmentation process and variant streams. The server farm 120 supports video deployment and streaming in the cloud 115. The original video 110 is segmented for live streaming using a segmenter component 210, producing the variant streams 130 and indexes (playlists) 220, controlling segmented delivery of the variant streams 130 to the target user devices, such as the notebook computers 142, the smartphones 145, and the wireless tablets 147, adapting live streaming specifics to the varying connectivity bandwidths 135 and other limitations (such as screen sizes and resolutions of target user devices).

Figure 3:
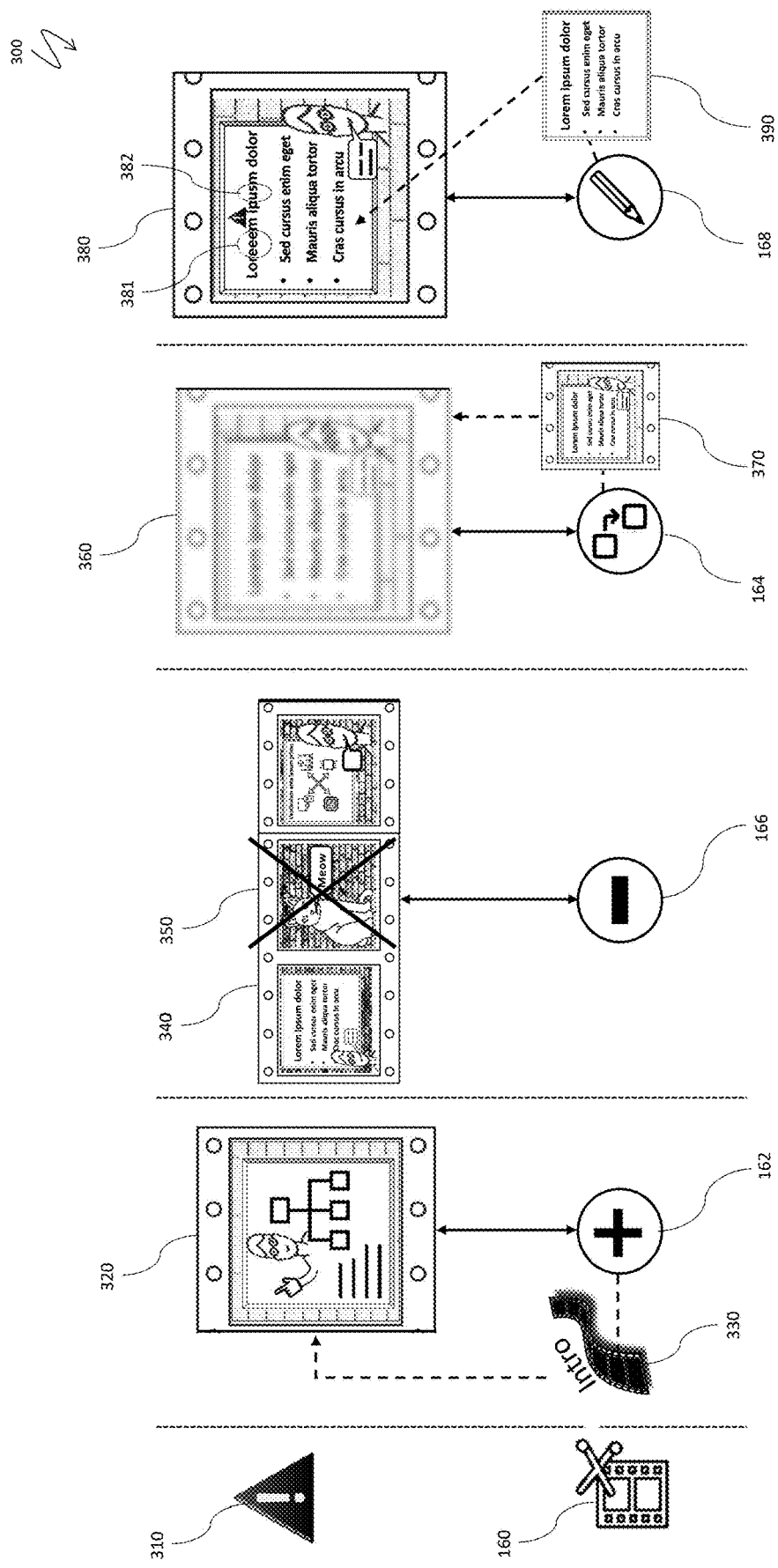
FIG. 3 is a schematic illustration of video deficiencies and editing actions, according to an embodiment of the system described herein.

FIG. 3 is a schematic illustration 300 of video deficiencies 310 and the editing requirements 160 addressing each deficiency. Missing content is a common type of deficiency when a video requires content addition. In the example of FIG. 3, a video 320 is lacking an introduction. An introduction 330 may be appended to the beginning of the video 320 by the editing action of augmentation 162 (introduced in FIG. 1 and the accompanying text).

A next type of deficiencies includes erroneous, misplaced portions of content. In the example of FIG. 3, a video 340 includes a misplaced episode, frame or other fragment 350 that does not belong to the video. The editing action of deletion 166 addresses such straightforward errors.

A third category of deficiencies includes portions of content that are placed correctly within a video but have low audio-visual quality. Low audio-visual quality may be illustrated by a blurred frame 360 (which may occur during live streaming due to insufficient bandwidth or low screen resolution of a target device). The editing action of replacement 164 fixes low audio-visual quality by replacing the content with a high quality copy 370 of the content in the needed variant stream(s). Note that the replacement editing action 164 is equivalent to deleting the low quality content fragment (the editing action 162) and augmenting the video with the equivalent high quality content inserted in place of the deleted fragment.

A fourth category of deficiencies consists of erroneous or misplaced portions within a fragment that allows immediate corrections without replacing an entire fragment (or frame). Immediate corrections may be addressed through the action of editing (modification) in place 168. In the example of FIG. 3, a video frame 380 within a presentation video has two textual errors 381, 382 in a slide title, which is addressed by editing in place by correcting the text directly on the slide using a clean copy 390 of the slide for the reference.

Figure 4:
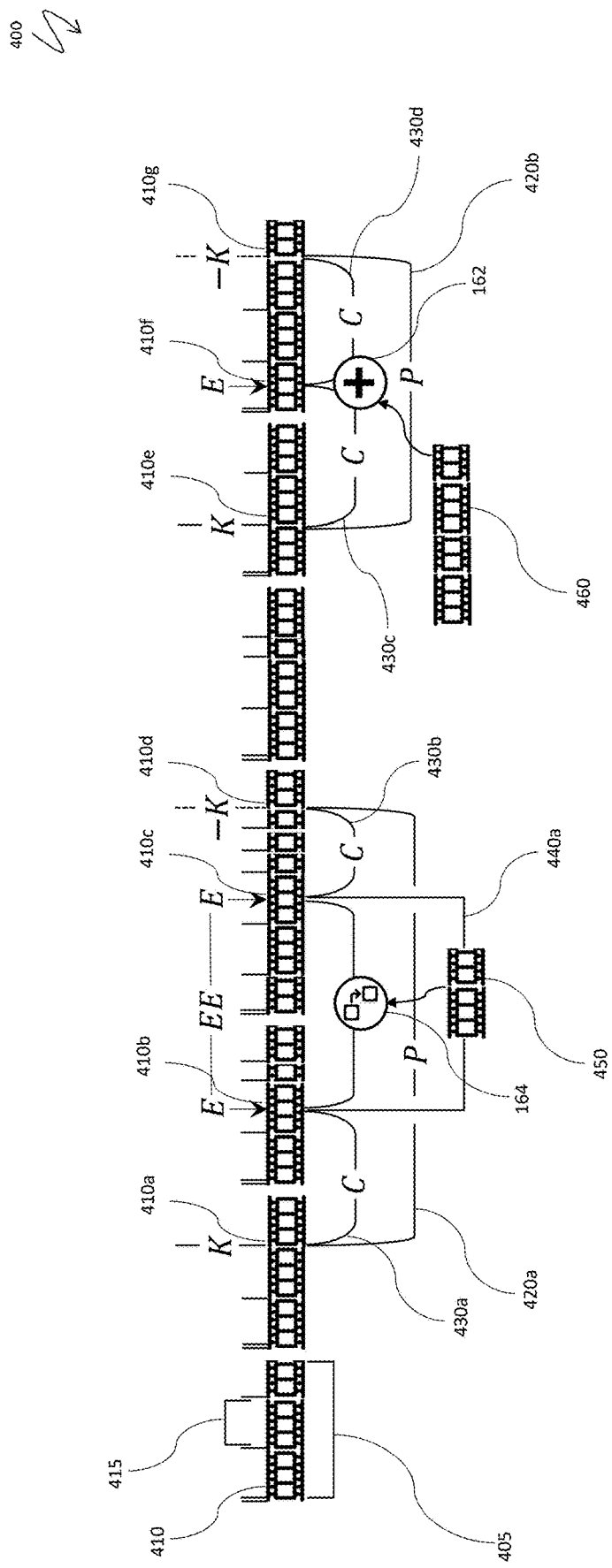
FIG. 4 is a schematic illustration of video editing locations and positions, according to an embodiment of the system described herein.

FIG. 4 is a schematic illustration 400 of video editing locations and positions. A video editing location is an immediate area of content modifications, i.e. editing actions of FIGS. 1, 3, within a variant stream. A video editing position is a broader portion of a variant stream, which includes editing location but may also include additional information allowing, for example, additional verification of the correctness of editing location and/or consistency of editing actions (see Section 4 of the Summary).

Key data structures of live streaming: a segment 405 of a variant stream, a keyframe 410, and a Group of Pictures 415 are explained in the left part of FIG. 4. Two editing positions 420a, 420b shown in FIG. 4 illustrate two different types of editing locations for the replacement editing action 164 and the augmentation editing action 162:

an editing location 440a for the replacement editing action 164 is an interval between two keyframes 410b, 410c, which includes portions of two adjacent segments of a variant stream; an interval 440a of the variant stream is replaced with content 450 associated with the editing action 164;

an editing location for the augmentation action is a single keyframe insertion point 410f where augmentation content 460 is added.

The editing positions 420a, 420b expand the two editing locations by adding consistency verification vicinities 430a, 430b, 430c, 430d on both sides of the editing locations; accordingly, the editing position 420a occupies a fragment of a variant stream between two keyframes 410a, 410d, while the editing position 420b lies between two different keyframes 410e, 410g. A formula 470 for an editing position is explained in Section 4 of the Summary.

Figure 5:
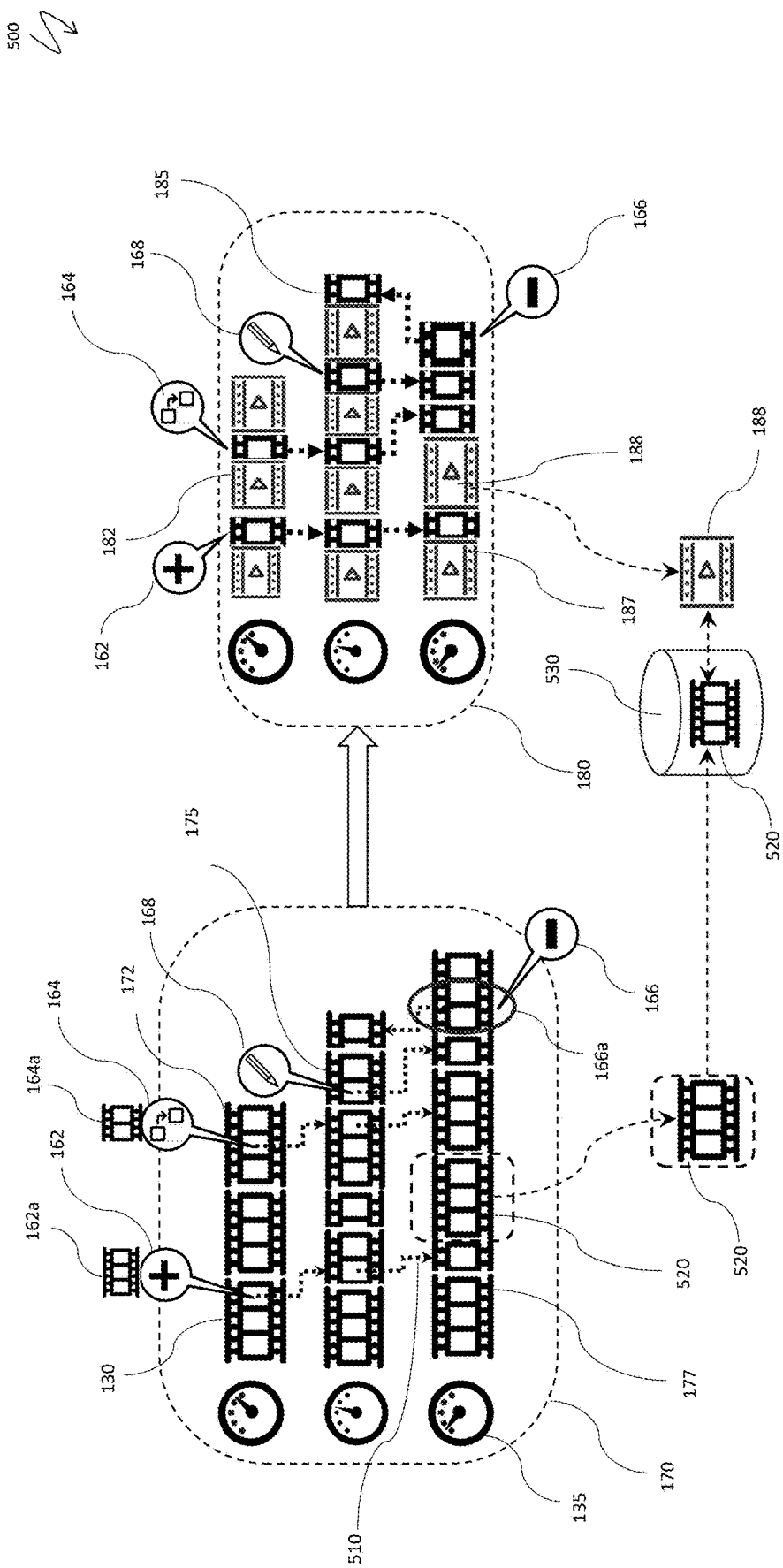
FIG. 5 is a schematic illustration of pre-editing markup and compact editable streams, according to an embodiment of the system described herein.

FIG. 5 is a schematic illustration 500 of the pre-editing markup and compact editable streams. The pre-editing markup 170 (see FIG. 1 with the accompanying text and Sections 6 of the Summary) assigns editing actions to the variant streams 172, 175, 177 where each of the editing actions 162, 164, 166, 168 is assigned to the corresponding segment 171 in one of the variable steams 172, 175, 177 and synchronized across the variable streams, as indicated by dotted arrows 510. The augmentation action 162 and supplemental video materials 162a of the augmentation action 162 are assigned to an end of the first segment 130 of the variant stream 172, and the replacement action 164 with additional video material 164a of the replacement action 164 is positioned in the middle of the last segment of the variable stream 172. The editing action 168 is assigned to the last segment of the variant stream 175, and the last action, the deletion action 166, is planned for a portion 166a of the last segment of the variant stream 177.

Note that for the variant stream agnostic editing actions (see Section 5 of the Summary), the action, a position of the action, location, and other specifics may be synchronized with all other variant streams, as shown by dotted arrows 510, propagating modifications to different user clusters with the variable bandwidth capabilities 135 and different features/parameters of the target devices (not shown in FIG. 5). As to variant stream specific editing actions (in this example, editing in place 168 and deletion 166), the action may be synchronized with some of the variant streams. In FIG. 5, the action 168 is initially assigned to the variant stream 175 and is synchronized with the variant stream 177, whereas the action 166 is initiated for the variant stream 177 and propagated to the variant stream 175.

Once the pre-editing markup is complete, the compact editable copy 180 of the video is built as a combination of the compact editable streams 182, 185, 187. The compact editable streams 182, 185, 187 are built by merging and compressing portions of each variant stream situated outside of editing positions associated with the editing actions 162, 164, 168, 166, into the textual, visual, and/or audio-visual summaries 188. Each of the summaries 188 references a full (unmerged and uncompressed) portion of a source fragment 520, saved in a compactification database 530. A compact editable copy of a pre-editing markup construction may significantly accelerate and facilitate the editing process.

Figure 6:
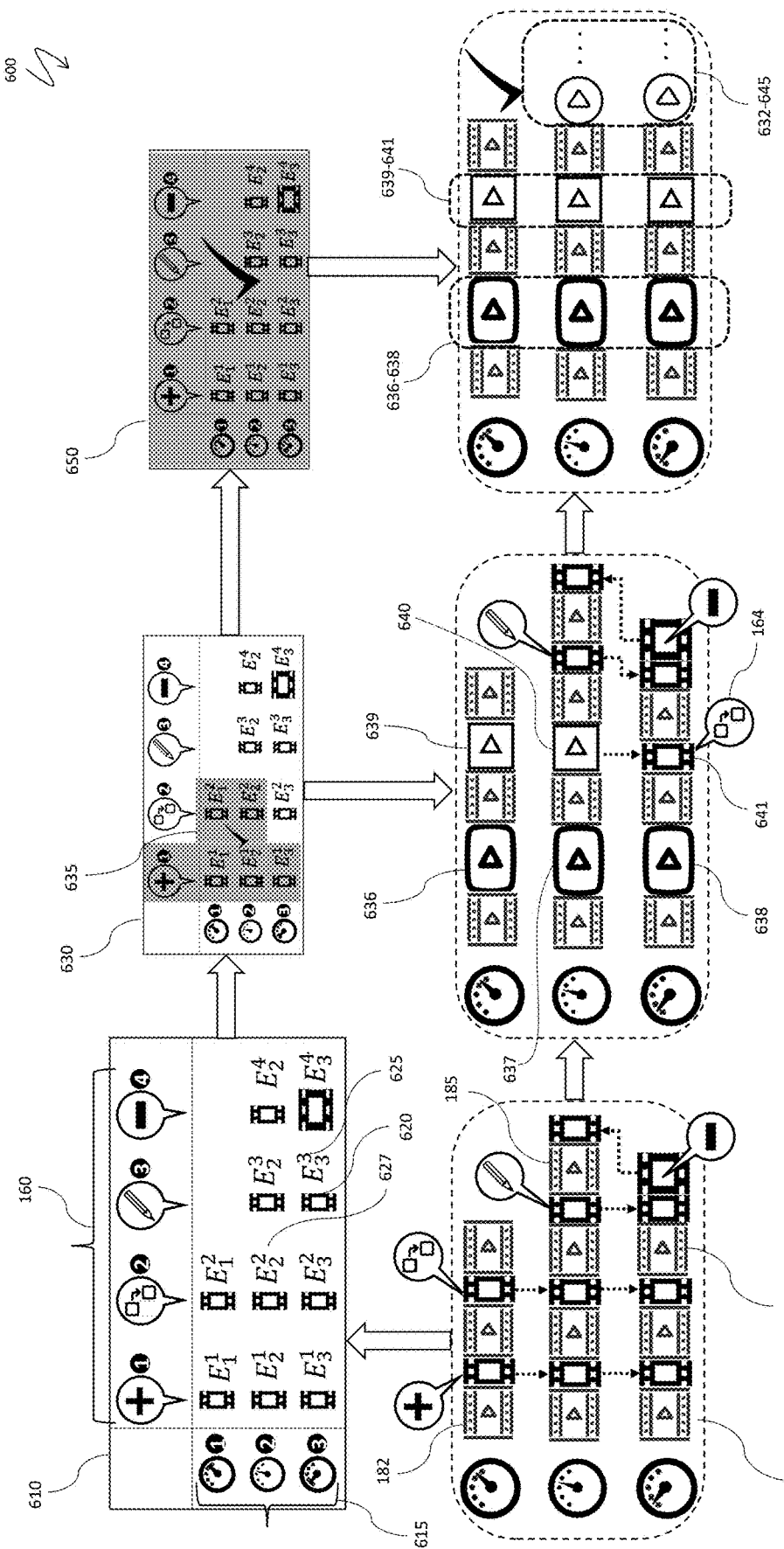
FIG. 6 is a schematic illustration of a video editing manifest and editing process, according to an embodiment of the system described herein.

FIG. 6 is a schematic illustration 600 of a video editing manifest and editing process. An editing manifest 610 is a navigable list of entries organized by an inventory 615 of variant streams, represented by supported bandwidths and other target device parameters and by the editing requirements 160 of editing categories. Each entry of the manifest 610 is a pair consisting of an editing position 620 in some variant stream, and a corresponding editing action 625. In other words, a manifest $\mathcal{M}$ can be defined as a matrix $(P_i^j, E_i^j)$, where $P_i^j$ is an editing position of the j-th action item in the i-th variant stream, and $E_i^j$ is an editing action associated with that item, with all necessary additional information, such as a supplementary content (as explained in connection with FIG. 5).

In FIG. 6, the manifest 610 has a simplified linear structure, where each column of items of the manifest 610 corresponds to one of four editing actions in the compact editable copy 180 and shows a corresponding editing action used in one of a subsequent one of the variant streams 182, 185, 187; for example, a manifest entry 627 is a pair ($P_2^2$, $E_2^2$), corresponding to the replacement editing action in the variant stream 185 in the compact editable copy.

As the editing of the compact editable copy progresses, completed editing entries are marked in the manifest 610. Thus, a partially completed manifest status 630 when processing by columns corresponds to the completed set of entries 635, corresponds to five new fragments 636, 637, 638, 639, 640 in the compact editable copy. A first unedited fragment 641 is the replacement editing action 164 for the variant stream 187, corresponding to the manifest entry ($P_3^2$, $E_3^2$) at the bottom of the second column (all entries in the third and fourth column of the manifest are also unprocessed).

The finalized editing project is shown by a manifest status 650, whereby all of the new fragments 636-641 and additional new fragments 642-645 (the edited fragments for the last two columns of the manifest are only partially shown in the compact editable copy) are entered as a result of editing actions and marked as completed.

Referring to FIG. 7, a system flow diagram 700 illustrates system functioning in connection with online video editing. Processing begins at a step 710, where the original video is recorded and placed on a server. After the step 710, processing proceeds to a step 712, where a live streaming segmenter creates variant streams and indexes (see FIG. 2 and the accompanying text). After the step 712, processing proceeds to a step 717, where an author (presenter) and the audience view the live streaming video under varying conditions. After the step 717, processing proceeds to a step 720, where a list of issues in the original video is compiled (see FIG. 3 and Section 2 of the Summary). After the step 720, processing proceeds to a test step 722, where it is determined whether the issues are detected for all variant streams. If not, processing proceeds to a step 727, where a list of affected variant streams is compiled. After the step 727, processing proceeds to a step 730, where editing actions for all issues are defined. (Note that the step 730 may be independently reached from the test step 722 if it is determined that issues are detected for all variant streams.)

After the step 730, processing proceeds to a step 732, where editing locations and positions are determined for all identified editing actions (see FIG. 4 for details). After the step 732, processing proceeds to a test step 737, where it is determined whether an intermediate re-segmentation is necessary for seamless editing access, which may occur when the editing locations and/or positions determined at the step 732 are frequently crossing the boundaries of the existing live streaming segments and include portions of the segments. If it is determined at the step 737 that an intermediate re-segmentation is necessary for seamless editing access, processing proceeds to a step 740, where re-segmentation of the original video is done and the editing locations and positions are rebuilt for the re-segmented variant video streams. After the step 740, processing proceeds to a step 742, where a video pre-editing markup is built, as explained in FIG. 5 and the accompanying text. (Note that the step 742 may be independently reached from the test step 737 if it is determined that the re-segmentation of the original video is not necessary.) After the step 742, processing proceeds to a step 747, where summary episodes between adjacent editing positions are constructed as part of creation of a compact editable copy (see FIG. 5 and the accompanying text for explanations). After the step 747, processing proceeds to a step 750, where the compact editable streams are fully built and the creation of the compact editable copy is completed. After the step 750, processing proceeds to a test step 752, where it is determined whether an intermediate re-segmentation is necessary for seamless editing access (analogously to the test step 737). If so, processing proceeds to a step 757, where the re-segmentation of the compact editable copy is performed and the editing locations and positions are rebuilt for the re-segmented variant video streams. After the step 757, processing proceeds to a step 760, where the editing manifest is created (see FIG. 6 for details). (Note that the step 760 may be independently reached from the test step 752 if it is determined that the re-segmentation of the compact editable copy is not necessary.)

After the step 760, processing proceeds to a step 762, where the compact editable copy is incrementally edited, based on the editing manifest (see FIG. 6 and the accompanying text). After the step 762, processing proceeds to a step 767, where the edited episodes are saved to the server farm. After the step 767, processing proceeds to a step 770, where the partially edited video (such as the partial editing corresponding to the state 630 of the editing manifest in FIG. 6) is segmented and streamed to the editor team. After the step 770, processing proceeds to a step 772, where the partially edited and streamed video is assessed by the editor team and potentially other participants of the editing and assessment process, such as a quality assurance team. After the step 772, processing proceeds to a test step 777, where it is determined whether the edits are acceptable. If so, processing proceeds to a test step 780, where it is determined whether the editing process has reached the end of the editing manifest. If not, processing proceeds to the step 762, which may be independently reached from the step 760; otherwise, processing proceeds to a step 782, where the summary episodes in the compact editable copy (fully edited) are replaced with the original content segments from the compactification database (see FIG. 5 and the accompanying text). After the step 782, processing proceeds to a step 787, where the fully edited variant streams are saved to the server farm.

After the step 787, processing proceeds to a step 790, where the system re-segments the edited video, builds final variant streams and prepares the video for live streaming. After the step 790, processing proceeds to a step 792, where the edited video is delivered to the audience via live streaming. After the step 792, processing is complete. If it is determined at the test step 777 that the edits are not acceptable, processing proceeds to a step 795, where the partially edited video and the assessment are stored on the server. After the step 795, processing proceeds to a step 797, where the review of editing process and intermediate results is scheduled. After the step 797, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations and functioning may vary from the illustrations presented herein. Further, various aspects of the system described herein may be deployed on various devices, including, but not limited to servers, desktop computers, notebooks, smartphones, tablets, and other mobile computers. Smartphones and tablets may use operating system(s) selected from the group consisting of: IOS, Android OS, Windows Phone OS, Blackberry OS, and mobile versions of Linux OS. Servers, desktop computers, notebooks and tablets may use operating system selected from the group consisting of Mac OS, Windows OS, Linux OS, Chrome OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A non-transitory computer readable medium containing software that edits a video stream containing defects that are detected in an original version of the video stream, the software comprising:
executable code that marks up the original version of the video stream to indicate one or more segments of the original video stream having at least one of the defects that are detected;
executable code that builds a compact editable copy of the original version of the video stream that includes editing positions corresponding to the one or more segments having at least one of the defects and includes abbreviated summaries of other segments of the original video stream that are between the editing positions;
executable code that modifies the compact editable copy by editing the one or more segments having at least one of the defects to provide a modified compact editable copy; and
executable code that constructs an edited video by replacing the abbreviated summaries in the modified compact editable copy with corresponding ones of the other segments of the original video stream that are between the editing positions.

2. The non-transitory computer readable medium of claim 1, wherein the other segments of the original video stream that are between the editing positions are stored in a database that is separate from the compact editable copy and the modified compact editable copy.

3. The non-transitory computer readable medium of claim 2, wherein executable code that constructs the edited video accesses the database to replace the abbreviated summaries with the corresponding ones of the other segments.

4. The non-transitory computer readable medium of claim 1, wherein locations of boundaries of the segments of the original video stream are adjusted for the modified compact editable copy in response to the at least one of the defects spanning multiple ones of the segments of the original video stream.

5. The non-transitory computer readable medium of claim 1, wherein executable code that detects defects in an original version of the video stream replays the original version of the video stream to different audiences and under different networking, hardware and system conditions and settings.

6. The non-transitory computer readable medium of claim 1, wherein the defects correspond to at least one of: deficiencies of a story provided by video stream, deficiencies of text provided in video stream, deficiencies of visual materials, deficiencies of audio materials, presentation quality of materials, behavior and presentation skills of the presenter(s), and communication aspects of the presentation.

7. The non-transitory computer readable medium of claim 1, wherein executable code that modifies the compact editable copy performs one or more editing actions.

8. The non-transitory computer readable medium of claim 7, wherein the editing actions include data corresponding to at least one of: descriptions of issues, editing instructions, supplementary materials, and assigned editors.

9. The non-transitory computer readable medium of claim 7, wherein the editing actions include augmentation, replacement, deletion, and editing in place.

10. The non-transitory computer readable medium of claim 1, wherein the original version of the video stream is provided as a plurality of variant streams and wherein each of the variant streams corresponds to a specific combination of networking, hardware, system conditions, and settings.

11. The non-transitory computer readable medium of claim 10, wherein a subset of the defects is independent from the networking, the hardware, the system conditions, and the settings.

12. The non-transitory computer readable medium of claim 11, wherein the subset of the defects that is independent from the networking, the hardware, the system conditions, and the settings causes a plurality of editing positions to be replicated in each of the variant streams.

13. The non-transitory computer readable medium of claim 10, further comprising:
executable code that creates a manifest having a navigable list of the variant streams and providing entries corresponding to editing actions for the variant streams.

14. The non-transitory computer readable medium of claim 13, wherein at least some entries of the manifest correspond to the subset of the defects that is independent from the networking, the hardware, the system conditions, and the settings.

15. The non-transitory computer readable medium of claim 13, further comprising:
executable code that modifies the entries of the manifest in response to applying editing actions to the segments of the modified compact editable copy.

16. The non-transitory computer readable medium of claim 15, wherein the manifest is used by different editors to transition at least some of the entries through different editing states.

17. The non-transitory computer readable medium of claim 16, wherein the different editing states include "draft", "complete", and "revised".

18. The non-transitory computer readable medium of claim 17, wherein the manifest is used to construct the edited video after the entries of the manifest indicate that all of the editing actions in the manifest have been applied and the editing states of all of the editing actions are "complete" for all editors.

* * * * *